United States Patent [19]

Emi et al.

[11] Patent Number: 5,486,606
[45] Date of Patent: Jan. 23, 1996

[54] CELLULOSIC POLYMER, BLOOD-TREATING DEVICE, AND PROCESS FOR PRODUCING THE SAME

[75] Inventors: Shingo Emi, Osaka; Kyoji Suzuki, Shizuoka; Yoshito Ikada, Uji, all of Japan

[73] Assignee: Teijin Limited, Osaka, Japan

[21] Appl. No.: 57,094

[22] Filed: May 4, 1993

[30] Foreign Application Priority Data

May 8, 1992 [JP] Japan ................... 4-115089

[51] Int. Cl.⁶ ........................ B01D 61/24; B01D 61/28
[52] U.S. Cl. ....................... 536/84; 536/92; 210/500.29
[58] Field of Search ................. 210/500.23, 500.29, 210/500–240; 536/43, 56, 84, 92

[56] References Cited

U.S. PATENT DOCUMENTS

| | | | |
|---|---|---|---|
| 1,930,472 | 10/1933 | Dreyfus . | |
| 2,338,681 | 1/1944 | Bock et al. | 536/43 |
| 2,837,511 | 6/1958 | Mantell . | |
| 3,441,142 | 4/1969 | Oja . | |
| 3,527,807 | 9/1970 | Tesoro | 536/43 |
| 4,213,859 | 7/1980 | Smakman et al. . | |
| 4,276,172 | 6/1981 | Henne et al. | 210/490 |
| 4,668,396 | 5/1987 | Baurmeister et al. | 210/500.27 |
| 4,731,162 | 3/1988 | Solarek et al. | 162/175 |
| 4,772,393 | 9/1988 | Pelger et al. | 210/500.29 |
| 4,950,303 | 8/1990 | Ishii | 8/513 |
| 4,962,140 | 10/1990 | Diamantoglou | 524/35 |

FOREIGN PATENT DOCUMENTS

| | | |
|---|---|---|
| 0147369 | 7/1985 | European Pat. Off. . |
| 472075A2 | 2/1992 | European Pat. Off. . |
| 2528029 | 12/1983 | France . |
| 4332564 | 11/1992 | Japan . |

OTHER PUBLICATIONS

House "Modern Synthetic Reactions" pp. 594–623 W. A. Benjamin, Inc., Philippines.

Allinger et al., Organic Chemistry "Additions to the Carbon–Carbon Double Band", pp. 304–305 (1971), Work Publishers.

Primary Examiner—Jeffrey Mullis
Attorney, Agent, or Firm—Burgess, Ryan and Wayne

[57] ABSTRACT

A cellulosic polymer wherein at least a part of the hydroxyl groups of the cellulosic polymer is modified as represented by the following general formula [I]:

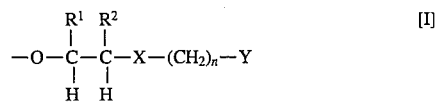

wherein $R^1$ and $R^2$ may be the same or different and each represents a hydrogen atom or a $C_1$ to $C_5$ alkyl group, X is a strong negative atomic group, and Y is

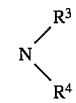

wherein $R^3$ and $R^4$ may be the same or different and each represents a member selected from the group consisting of a hydrogen atom, a $C_1$ to $C_5$ alkyl group and a $C_3$ to $C_6$ cycloalkyl group, or

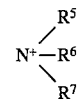

Y is
wherein $R^5$, $R^6$ and $R^7$ may be the same or different and each represents a member selected from the group consisting of a hydrogen atom, a $C_1$ to $C_5$ alkyl group, a $C_3$ to $C_6$ cycloalkyl group and a $C_6$ to $C_{10}$ aryl group, and n is from 1 to 10. Using the cellulosic polymer, a blood-treating device is assembled.

4 Claims, No Drawings

CELLULOSIC POLYMER, BLOOD-TREATING DEVICE, AND PROCESS FOR PRODUCING THE SAME

BACKGROUND OF THE INVENTION

1. Field of the Invention

This invention relates a cellulosic polymer, a blood-treating device and a process for producing the same. More particularly, the present invention aims at providing a blood-treating device which makes it easy to remove phosphoric acid ions and to further improve bio-compatibility.

2. Description of the Related Art

A dialysis membrane for the purification of blood comprising regenerated cellulose has long been known, and has primarily been used at present, too, as a material for an artificial kidney. Accordingly, a large number of attempts have been made to date to modify the regenerated cellulose.

Japanese Examined Patent Publication (Kokoku) No. 57-35018 discloses a hemodialysis membrane obtained by chemically bonding an antithrombogen compound to a cellulose, and German Patent No. 1720087 discloses a membrane with anti-coagulation of blood obtained by first reacting a membrane material with a halogenated alkyl and then with an alkali salt of an antithrombogen compound having a cationic group. Further, Japanese Unexamined Patent Publication (Kokai) No. 61-8105 discloses a dialyzer mainly having a feature thereof in that a reaction product between a hydroxy compound and a polyfunctional isocyanate is chemically bonded to the regenerated cellulose. Japanese Unexamined Patent Publication (Kokai) No. 61-113459 discloses a dialyzer using a diethylaminoethylcellulose and a sulfoethylcellulose at a specific proportion.

All of the prior art references described above disclose the membranes having improved biocompatibility, particularly anti-coagulation of blood, prevention of leukopenia and anti-complement activity.

On the other hand, removal of phosphorus is not sufficient during dialysis of patients affected by chronic renal insufficiency. Phosphorus cannot be removed by ordinary dialysis because phosphoric acid ions have charge or form a complex with proteins and thereby exhibits a behavior similar to a solute having a large molecular weight. Residual phosphorus is believed to result in acidosis.

Accordingly, an alumina gel has been used favorably to correct this acidosis, but since it has been clarified that a trace amount of $Al^{3+}$ absorbed is associated with encephalopathy, an excessive use of the alumina gel has become a problem. For this reason, the development of a membrane capable of easily removing the phosphoric acid ions by dialysis has been earnestly desired.

SUMMARY OF THE INVENTION

It is therefore an object of the present invention to provide a blood-treating device such as a dialyzer capable of easily removing the phosphoric acid ions.

It is another object of the present invention to provide a blood-treating device having excellent biocompatibility.

To accomplish these objects, the inventors of the present invention previously conducted intensive studies and found out that a modified cellulosic polymer obtained by reacting hydroxyl groups of a cellulosic polymer with polyfunctional isocyanate groups to form urethane bonds, and introducing amino groups directly into the remaining isocyanate groups or terminal isocyanate groups through urea bonds, was effective for the object described above. Based on this discovery, the inventors filed Japanese Patent Application No. 3-132168.

Since performance of the polymer is not yet sufficiently high, the inventors have furthered their studies and have found that a cellulosic polymer the hydroxyl group of which is modified as represented by the formula [I] below is more effective and have thus completed the present invention.

In other words, the present invention provides a cellulosic polymer at least a part of the hydroxyl groups of which is modified as represented by the following formula [I]:

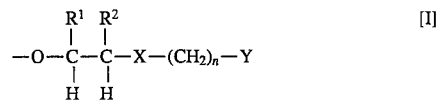

wherein $R^1$ and $R^2$ may be the same or different, and each represents a hydrogen atom or a $C_1$ to $C_5$ alkyl group, X is a strong negative atomic group, and Y is

wherein $R^3$ and $R^4$ may be the same or different, and each represents a member selected from/the group consisting of a hydrogen atoms, $C_1$ to $C_5$ alkyl groups and $C_3$ to $C_6$ cycloalkyl group, or is

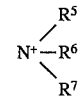

wherein $R^5$, $R^6$ and $R^7$ may be the same or different, and each represents a member selected from the group consisting of a hydrogen atom, $C_1$ to $C_5$ alkyl groups, $C_3$ to $C_6$ cycloalkyl groups and $C_6$ to $C_{10}$ aryl groups, and n is from 1 to 10.

Further, the present invention provides a blood-treating apparatus comprising a cellulosic polymer, wherein at least a part of the hydroxyl groups of the cellulosic polymer constituting at least the surface capable of coming into contact with blood is modified as represented by the above formula [I].

The present invention provides also a process for producing a blood-treating device which comprises forming a hollow fiber membrane using a cellulosic polymer, assembling a hollow fiber type blood-treating device using the hollow fiber membrane, bringing an aqueous alkali solution into contact with at least the hollow fiber membrane capable of coming into contact with blood, and bringing an aqueous solution containing a compound represented by the following formula [II],

$$R^1CH=CR^2X—(CH_2)_n—Y \qquad [II]$$

wherein $R^1$, $R^2$, X, Y and n are as defined in the above formula [I], into contact with the blood-treating device so as to modify at least a part of the hydroxyl groups of the cellulosic polymer on at least the surface capable of coming into contact with blood as represented by the formula [I].

Furthermore, the present invention provides a process for producing a blood-treating device which comprises assembling a hollow fiber type blood-treating device by the use of a hollow fiber membrane obtained by the steps of forming a hollow fiber membrane using a cellulosic polymer, bringing the cellulosic polymer hollow fiber membrane into contact with an aqueous alkali solution and then into contact with an aqueous solution containing a compound represented by the formula [II] and thus modifying at least a part of the hydroxyl groups of the cellulosic polymer on at least the surface capable of coming into contact with blood to a modified polymer as represented by the formula [I].

DESCRIPTION OF THE PREFERRED EMBODIMENTS

Hereinafter, the present invention will be described in further detail.

Any cellulosic polymers can be used as the cellulosic polymer of the present invention so long as they contain a modifiable hydroxyl group as represented by the formula [I]. Definite examples of cellulosic polymers to be modified according to the present invention include celluloses such as regenerated cellulose and cellulose obtained by a copper-ammonium process, cellulose esters such as cellulose diacetate containing an ester group such as an acetate ester group introduced into a part of the hydroxyl groups of the cellulose, and cellulose ethers such a methyl cellulose containing an ether bond introduced into a part of the hydroxyl groups. Among them, preferred are the cellulose esters and cellulose and most preferred is cellulose.

In the formula [I], $R^1$ and $R^2$ may be the same or different, and each represents a hydrogen atom or a $C_1$ to $C_5$ alkyl group. Definite examples of the $C_1$ to $C_5$ alkyl groups include methyl, ethyl, n-propyl, isopropyl, sec-butyl, t-butyl, n-pentyl and neo-pentyl. Preferred examples of $R^1$ and $R^2$ are the hydrogen atom, methyl and ethyl. A particularly preferred example of $R^2$ is the hydrogen atom.

In the formula

as Y in the formula [I], $R^3$ and $R^4$ may be the same or different, and each represents a member selected from the group consisting of a hydrogen atom, $C_1$ to $C_5$ alkyl groups, $C_3$ to $C_6$ cycloalkyl groups and $C_6$ to $C_{10}$ aryl groups. Definite examples of the $C_1$ to $C_5$ alkyl groups are the same as those of $R^1$. Among them, the methyl group, the ethyl group, the propyl group, etc., are particularly preferred. Definite examples of the $C_3$ to $C_6$ cycloalkyl groups include cyclopropyl, cyclopentyl and cyclohexyl, and among them, cyclohexyl is preferred. Definite examples of the $C_6$ to $C_{10}$ aryl groups include phenyl and naphthyl, and phenyl is particularly preferred.

In the formula

as Y in the formula [I], $R^3$ and $R^4$ are preferably the same, and each is preferably a hydrogen atom or a $C_1$ to $C_5$ alkyl group. Particularly, the hydrogen atom, methyl, ethyl and propyl are preferred.

as Y in the formula [I], $R^5$, $R^6$ and $R^7$ may be the same or different, and each represents the member selected from the same group as that of $R^3$ described above. Among them, the hydrogen atom, methyl, ethyl and propyl are preferred, and at least one of them is particularly preferably the hydrogen atom.

X in the formula [I] represents a strong negative atomic group, and its definite examples include

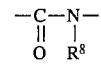

wherein $R^8$ is a member selected from the group consisting of a hydrogen atom, a $C_1$ to $C_5$ alkyl group, a $C_3$ to $C_6$ cycloalkyl group and a $C_6$ to $C_{10}$ aryl group,

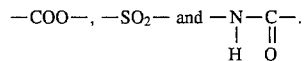

Definite examples of the $C_1$ to $C_5$ alkyl group, the $C_3$ to $C_6$ cycloalkyl group and the $C_6$ to $C_{10}$ aryl group of $R^8$ are the same as those of $R^3$ described above.

X in the formula [I] is particularly preferably the member expressed by the formula

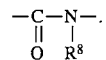

The hydrogen atom and the $C_1$ to $C_5$ alkyl group are preferred as $R^8$, and particularly preferred are the hydrogen atom, methyl, ethyl and propyl.

Symbol n in the formula [I] represents an integer of 1 to 10. Among them, 1 to 6 are preferred, and 1 to 5 are particularly preferred.

The cellulosic polymer of the present invention, at least a part of the hydroxyl group of which is modified as represented by the formula [I], can be prepared by the steps of bringing an aqueous alkali solution containing KOH, NaOH, etc., into contact with a cellulosic polymer such as cellulose, cellulose ester, etc., and then bringing the polymer into contact with an aqueous solution containing a cationic compound represented by the formula, $$R^1CH=CR^2X(CH_2)_n-Y \qquad [II]$$

wherein $R^1$ $R^2$, X, Y and n are as defined above.

The blood-treating device according to the present invention is characterized in that at least the surface of a device capable of coming into contact with blood comprises a cellulosic polymer and at least a part of the hydroxyl groups of the cellulosic polymer is modified as represented by the aforementioned formula [I].

Definite examples of the blood-treating device according to the present invention include a blood dialyzer, a plasma separator, an artificial lung and a blood filter each using the hollow fiber membrane. It may also be an artificial blood vessel. A particularly preferred blood-treating device is a hollow fiber type artificial kidney.

Such a hollow fiber type blood-treating device is characterized in that at least a part of the hydroxyl group in the cellulosic polymer constituting at least the surface of the hollow fiber membrane, with which the blood come into contact, is modified as represented by the afore-mentioned formula [I]. Incidentally, the hollow fiber membrane may comprise the cellulosic polymer as a whole, or the two- or more-layered multi-layer hollow fiber membrane in which only the surface coming into contact with the blood comprises the cellulosic polymer and the other portions comprise other polymers such as polysulfone may also be used.

The hollow fiber type blood-treating device according to the present invention can be obtained by the steps of forming a hollow fiber membrane using a cellulosic polymer, assembling a hollow fiber type blood-treating device using the resulting hollow fiber membrane, bringing an aqueous alkali solution into contact with at least the hollow fiber membrane capable of coming into contact with blood, and bringing then the hollow fiber membrane into contact with an aqueous solution containing a cationic compound represented by the following formula [II] so as to cause the Michael reaction and to convert the cellulosic polymer on at least the surface capable of coming into contact with blood to the cellulosic polymer modified as expressed by the formula [I], $$R^1CH=CR^2X-(CH_2)_n-Y \qquad [II]$$

wherein $R^1$, $R^2$, X, Y and n are as defined above.

Besides the process described above, the hollow fiber type blood-treating device according to the present invention can be produced by the steps of forming a hollow fiber membrane using a cellulosic polymer, bringing the cellulosic polymer into contact with an aqueous alkali solution, then into contact with an aqueous solution containing the cationic compound represented by the formula [II] so as to cause the Michael reaction and to modify the cellulosic polymer on at least the surface, which can come into contact with blood, as represented by the formula [I], and assembling the hollow fiber type blood-treating device using the resulting modified hollow fiber membrane.

The cellulosic polymer according to the present invention is a cellulosic polymer having a novel side chain that has not existed in the past, and can be a blood purification membrane having excellent performance for eliminating the phosphoric acid ions. Since this polymer has extremely high adsorption power of heparin, it is possible to obtain a blood-treating device having high anticoagulation performance, less remaining blood and excellent biocompatibility by using a greater amount of heparin when dialysis is carried out using the hollow fiber membrane.

Hereinafter, the present invention will be explained in further detail with reference to Examples thereof, but these Examples are merely illustrative and are in no way limitative.

EXAMPLE 1

Two hollow fiber type blood-treating devices were produced by bundling regenerated cellulose hollow fibers having an inner diameter of 200 μm and a thickness of 20 μm in a wet state. A 2% aqueous NaOH solution at 45° C. was injected from the contact side of the hollow fiber membrane of one of the blood-treating device with blood. Further, a 12% aqueous solution of dimethylaminopropyl acrylamide (DMAPAA: a product of Kojin K.K.) at 45° C. was injected and the blood-treating device was kept as such for 24 hours. Thereafter, this aqueous solution was removed and pure water rendered acidic with acetic acid was injected. Further, washing was repeatedly carried out with distilled water. There was thus obtained the blood-treating device the generated cellulose fibers of which were modified by DMA-PAA, and which could be used for dialysis.

Phosphoric acid ion removing performance was measured in vitro for the modified cellulose hollow fiber type blood-treating device thus obtained and for the hollow fiber type blood-treating device which was not subjected to the modification treatment. The measurement of DA (phosphorus) (dialysance of phosphorus) representing phosphoric acid ion removing performance in vitro was carried out in accordance with the procedures shown in Table 1.

TABLE 1

| step | procedure |
|---|---|
| preparation of model substance solution | * 3 g of sodium dihydrogenphosphate (NaH₂PO₄) was dissolved in 5 l of DW.<br>* 14.4 g of disodium hydrogenphosphate (Na₂HPO₄) was dissolved in 20 l of DW.<br>* 225 g of NaCl was dissolved in 25 l in total of the solution to prepare a B side solution as a 0.9% NaCl concentration.<br>* Model dialysis and sampling were carried out by a performance evaluator using the solution containing DW in a 0.9% NaCl concentration as a D side solution. |
| sampling amounts coloration | * B (bath side) mother solution 0.4 ml<br>* D (out side) dialyzed solution 0.4 ml<br>* 10 ml of a coloration solution prepared by mixing the phosphor B test Wako A solution and B solution at a proportion of 1:1 was added to 0.4 ml of the sampled solution, and the mixture was sufficiently mixed by a test tube mixer. |
| measurement | * Twenty minutes later, the colored sample was measured by a spectrophotometer at a wavelength of 690 nm. |

DA was calculated in accordance with the following formula [III]:

$$DA = \frac{[B]-[O]}{[B]} \times Q_B \qquad [III]$$

[B]: reading of mother solution on spectrophotometer
[O]: reading of dialyzed solution on spectrophotometer
$Q_B$: 200 ml/min (amount of solution on the blood side)

As a result of the measurement, it was found that whereas DA (phosphorus) of the non-treated blood-treating device was 140 ml/min, DA (phosphorus) of the blood-treating device after the modification treatment was as high as 153 ml/min.

We claim:

1. A blood treating device comprising a cellulosic polymer which contacts blood wherein a DA (phosphorous) improving number of hydroxyl groups on at least one portion of the cellulosic polymer which contacts the blood are modified as represented by the formula:

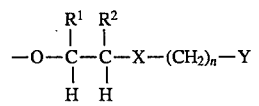

wherein $R^1$ and $R^2$ may be the same or different and each represents a hydrogen atom or a $C_1$ to $C_5$ alkyl group, X is a member selected from the groups consisting of

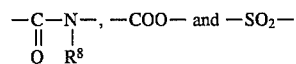

$R_8$ is a member selected from the group consisting of a hydrogen atom, a $C_1$ and $C_5$ group, a $C_3$ to $C_6$ cycloalkyl group, and a $C_6$ to $C_{10}$ alkyl group,

wherein $R^3$ and $R^4$ may be the same or different and each represents a member selected from the group consisting of a hydrogen atom, a $C_1$ and $C_5$ alkyl group and a $C_3$ to $C_6$ cycloalkyl group, or Y is

wherein $R^5$, $R^6$ and $R^7$ may be the same or different and each represents a member selected from the group consisting of a hydrogen atom, a $C_1$ to $C_5$ alkyl group, a $C_3$ to $C_6$ cycloalkyl group and a $C_6$ to $C_{10}$ aryl group, and n is integer of 2 to 10.

2. A blood-treating device according to claim 1, wherein said cellulosic polymer forms a hollow fiber membrane.

3. A process for producing a blood-treating device comprising the steps of:

forming a hollow fiber membrane comprising a cellulosic polymer;

assembling a blood treating device comprising said hollow fiber membrane;

contacting at least a portion of said hollow fiber membrane which contacts the blood with an aqueous alkali solution and then with an aqueous solution containing a compound of the formula:

$$R^1CH=CR^2X-(CH_2)_n-Y \qquad (II)$$

to modify a DA (phosphorous) improving number of the hydroxyl groups of said portion of cellulosic polymer which contacts the blood, according to the formula

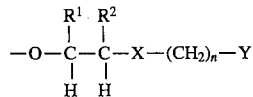

wherein $R^1$ and $R^2$ may be the same or different and each represents a hydrogen atom or a $C_1$ to $C_5$ alkyl group, X is a member selected from the group consisting of

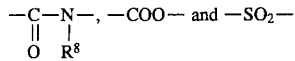

wherein $R^8$ is a member selected from the group consisting of a hydrogen atom, a $C_1$ to $C_5$ alkyl group, a $C_3$ to $C_6$ cycloalkyl group and a $C_6$ to $C_{10}$ aryl group, and Y is

wherein $R^3$ and $R^4$ may be the same or different and represents a member selected from the group consisting of a hydrogen atom, a $C_1$ to $C_5$ alkyl group, a $C_3$ to $C_6$ cycloalkyl group, or Y is

wherein $R^5$, $R^6$ and $R^7$ may be the same or different and each represents a member selected from the group consisting of a hydrogen atom, a $C_1$ to $C_5$ alkyl group, a $C_3$ to $C_6$ cycloalkyl group and a $C_6$ to $C_{10}$ aryl group, and n is an integer from 2 to 10.

4. A process for producing a blood-treating device comprising the steps of: forming a hollow fiber membrane comprising a cellulosic polymer; contacting at least a portion of said hollow fiber membrane which contacts the blood with an aqueous alkali solution and then with an aqueous solution containing a compound of the formula $$\overset{R^2}{\underset{|}{R^1CH=C}}-X-(CH_2)_nY \qquad (II)$$

to modify a DA (phosphorus) improving number of hydroxyl groups of said portion of said cellulosic polymer which contacts the blood, as represented by the formula

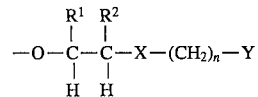

wherein $R^1$ and $R^2$ may be the same or different and each represents a hydrogen atom or $C_1$ to $C_5$ alkyl group, X is a member selected form the groups consisting of

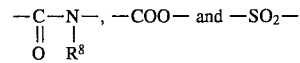

$R^8$ is a member selected from the group consisting of a hydrogen atom, a $C_1$ to $C_5$ alkyl group, a $C_3$ to $C_6$ cycloalkyl group and a $C_6$ to $C_{10}$ aryl group, and Y is

wherein $R^3$ and $R^4$ may be the same or different and represents a member selected from the group consisting of a hydrogen atom, a $C_1$ to $C_5$ alkyl group and a $C_3$ to $C_6$ cycloalkyl group, or Y is

wherein $R^5$, $R^6$ and $R^7$ may be the same or different and represents a member selected form the group consisting of a hydrogen atom, a $C_1$ to $C_5$ alkyl group, a $C_3$ to $C_6$ cycloalkyl group and a $C_6$ to $C_{10}$ aryl group, and n is an integer from 2 to 10, and assembling a hollow fiber type blood-treating device using said hollow fiber membrane.

* * * * *